May 14, 1957  A. J. HIRST  2,791,893
TORQUE TRANSMISSION COUPLINGS
Filed Aug. 19, 1954  4 Sheets-Sheet 2

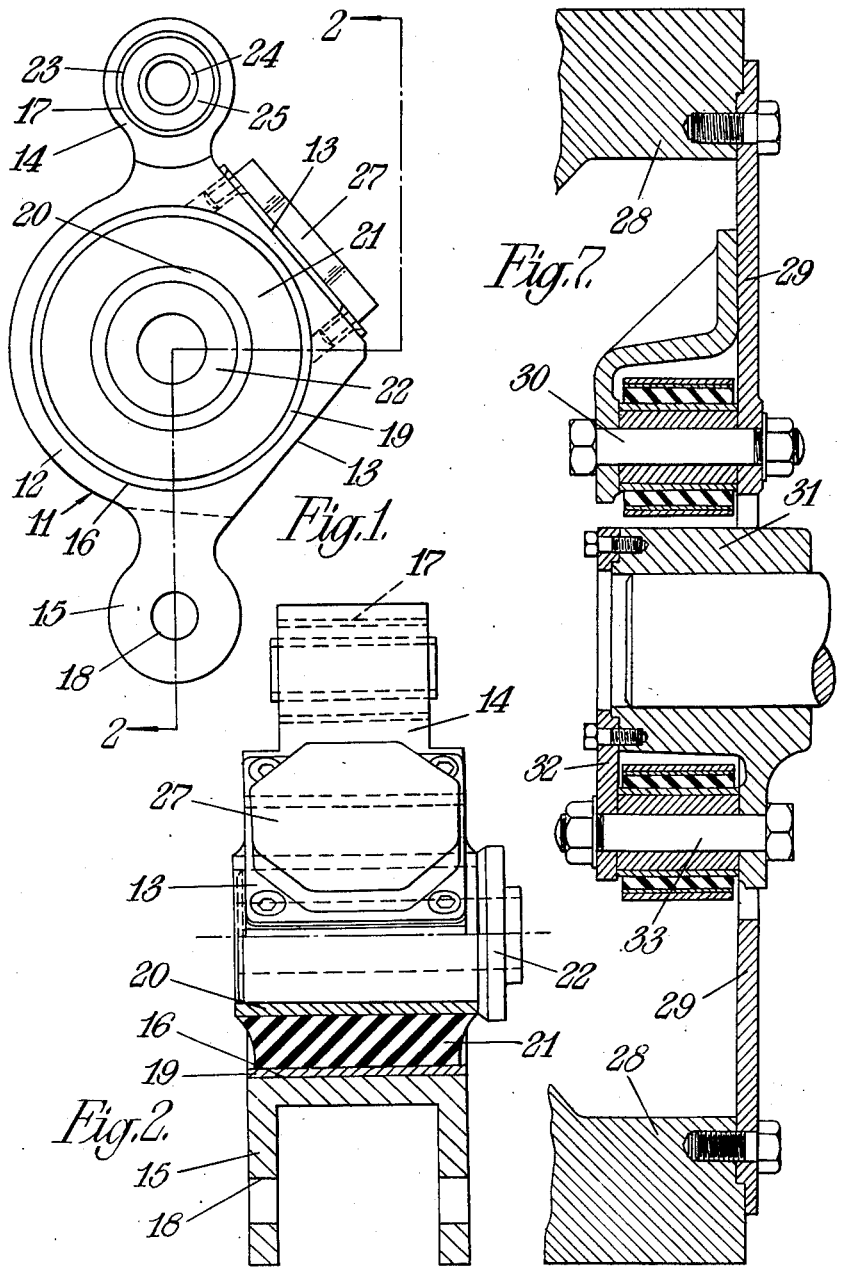

Inventor:
Archie John Hirst
By Ralph B. Stewart
Attorney

May 14, 1957 A. J. HIRST 2,791,893
TORQUE TRANSMISSION COUPLINGS
Filed Aug. 19, 1954 4 Sheets-Sheet 3

Inventor:
Archie John Hirst
By Ralph B. Stewart
Attorney

United States Patent Office 2,791,893
Patented May 14, 1957

2,791,893

TORQUE TRANSMISSION COUPLINGS

Archie John Hirst, Leicester, England, assignor to Metalastik Limited, Leicester, England, a company of Great Britain Application August 19, 1954, Serial No. 450,910

3 Claims. (Cl. 64—11)

This invention relates to a new or improved flexible driving coupling for transmitting torque from a driving shaft to a coaxial or substantially coaxial driven shaft.

Such flexible driving couplings are used in various situations and to meet various demands. Thus they may be used to transmit power to the propeller shaft of a motor vehicle from the engine or from the propeller shaft to the road wheels. Again, it may be desired to locate such a coupling within the hub of the normal driving clutch, when of course one of the major difficulties is that imposed by the restriction upon the dimensions, the space available being too small to enable one to fit in a coupling of known type which shall be able to cope with the large amplitude of torque fluctuation and the small mean torque, especially at the high temperature that prevails in this region during running. In certain of its uses moreover, it may be desired in order to save complication and cost that the coupling should act as a universal joint: even if the coupling is not required to cope with the large angles, up to say 25 degrees, that can be handled by known metal universal joints, at least it may have to accommodate itself to a misalignment, of up to say 7 degrees, between the axes of the two shafts between which power is to be transmitted. In any of these cases it may be desired to have a coupling which shall absorb torsional vibrations. The present invention provides a flexible coupling which is likely to be useful in attaining one or more of these desiderata.

In accordance with the invention two or more tangentially arranged rockers capable of being connected to the driving shaft are arranged in circumferential alternation with a like number of similar rockers capable of being connected to the driven shaft and each rocker is hinged to the rocker on either side of it by torsionally-resistant resilient elements such that the hinge points are capable of movement radially of the axis of the coupling.

In accordance with a further feature of the invention, a set of two or more tangentially arranged rockers is arranged in circumferental alternation with a set of a like number of similar rockers the rockers of one set being mounted on the arms of a spider capable of being driven by the driving shaft and the rockers of the other set being mounted on the arms of a spider capable of driving the driven shaft, and each rocker is connected with its spider arm by a torsionally-resistant resilient element.

In accordance with a yet further feature of the invention, both the hinges between rockers and the hinges between rocker and spider arms, are provided by resilient elements.

The torsionally-resistant resilient elements are preferably of rubber or the like material, and may be in the form of a rubber or like bush having an external peripheral engagement with the one part to which it is secured and an internal peripheral engagement with the other part. The rubber bush may be bonded at its peripheries to the metal with which it is in engagement, that is to say either to the parts in the coupling with which it is associated, or to inner and outer metal sleeves forming part of the bush unit itself. The bushes, whether or not they are bonded, may be precompressed.

The number of rockers in each set will depend upon the dimensions of the coupling and the torque to be transmitted and may be any convenient number, though of course there must be at least two in order that there may be radial movement of the hinge points between adjacent rockers when there occurs an angular displacement between the two sets.

The following description relates to the accompanying drawings, which show by way of example only, two embodiments of the invention. In the drawings:

Figure 1 is an end view, and

Figure 2 is a side and section view on the line 2—2 of Figure 1, of a rocker for use in a four-rocker assembly;

Figure 7 is a diametral section through a coupling as shown in Figure 6 mounted between driving and driven members of a transmission.

Figure 3:
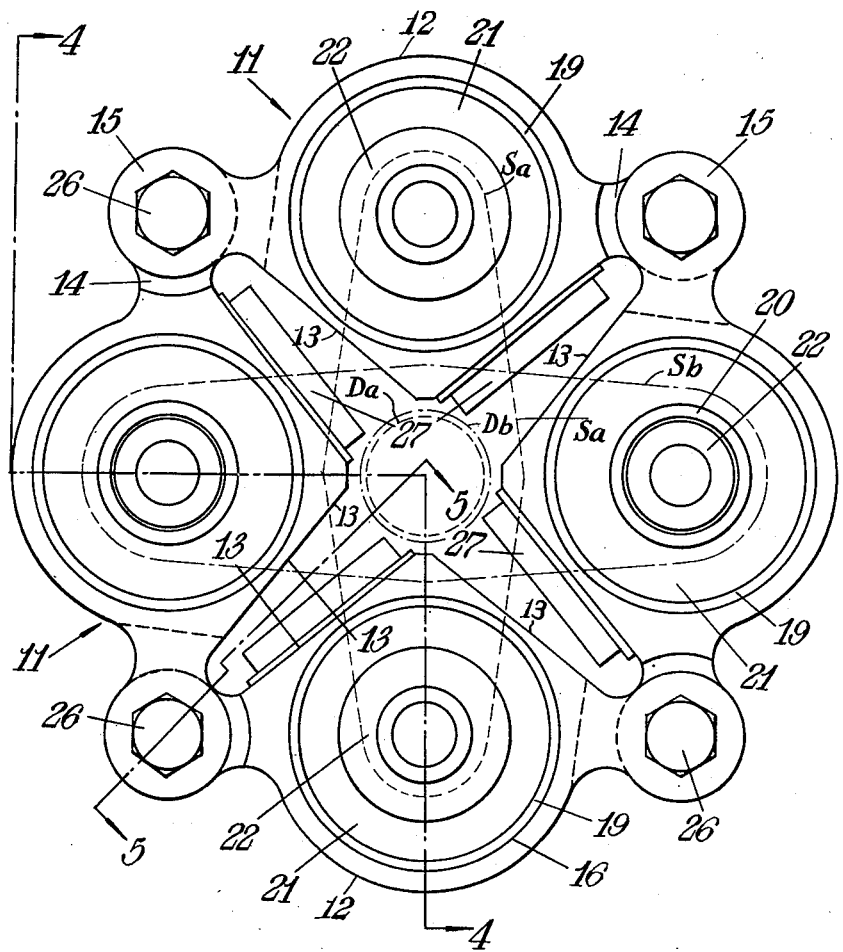
Figure 3 is an end view.
Figure 4:
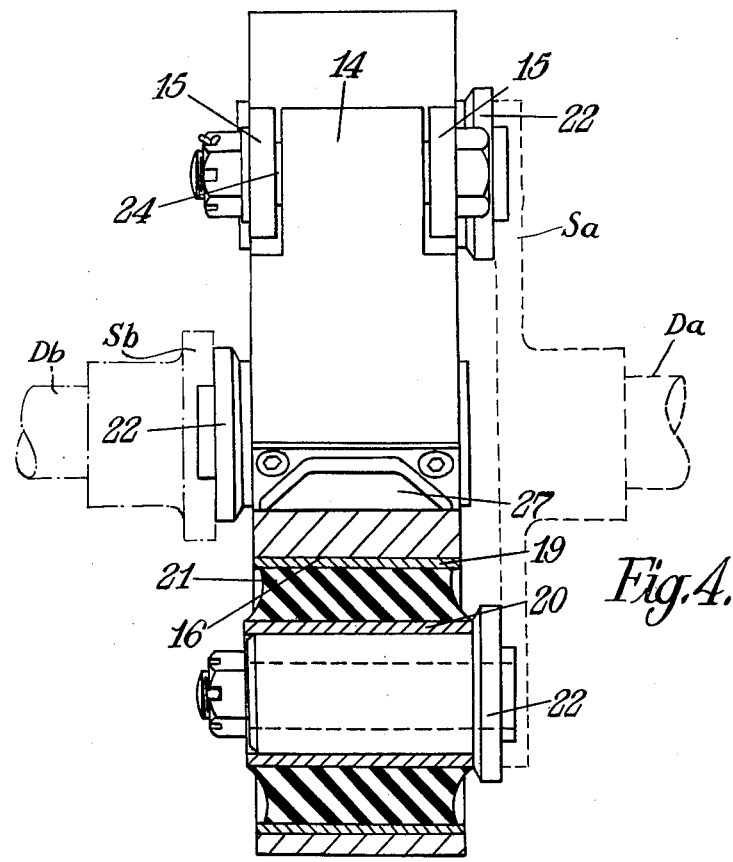
Figure 4 is a side and sectional view on the line 4—4 of Figure 3, of a four-rocker assembly.

The coupling to be described with reference to Figures 1 to 4 of the accompanying drawings has been designed for use in the front half of the propeller shaft of an oil-engined passenger or goods vehicle, this shaft transmitting power either from the engine to a separately mounted gear box or from a gear box integrally mounted with the engine to an intermediate bearing carried from a cross member. In particular it is intended for use in passenger omnibuses where the engine is displaced rather to one side of the front of the vehicle chassis, thereby imposing a permanent angularity on the joint. In these buses, with the couplings used hitherto, there have been complaints from the operators of transmission rattle, this rattle being most pronounced when the engine was working at low power and being found particularly objectionable when the bus was slowing down to a stop.

In this coupling there are four rockers 11, one of which is shown in Figures 1 and 2. Each such rocker 11 has a centre portion 13 which may be described as being of an approximate sector shape, having on that side which in assembly is to be the inner side two flats 13 with an angle between them of about 120 degrees. At the two ends, which may with reference to the assembly be described as circumferential ends, are ears 14 and 15, so reduced in thickness that they may overlap. Thus the ear 14 of one rocker 11 consists of a single tongue adapted to fit between the two limbs of the other, forked, ear 15 of another rocker 11.

The four rockers 11 are assembled as shown in Figure 3 in a common plane tangentially around a circle with the ear 14 of one rocker overlapping the ear 15 of the immediately adjacent rocker. So overlapping, the ears are hinged together, in a manner to be more particularly described, so as to form a unitary system having an exterior configuration approximating to a disc-shape and having the interior flats 13 defining between them a cruciform space of which the arms taper slightly towards the ears.

The axes of the three pivots on each rocker, those to the adjacent rockers and that to the spider arm, or expressing it more precisely, the centres of the centre aperture 16 and of the ear apertures 17 and 18, are in a straight line.

On one side of this disc-like assembly of the four rockers is a two-arm spider Sa (shown in dotted lines in Figures 3 and 4) extending diametrically across the disc and hinged, in a manner which again will be more particularly described, to the centre portions 12 of two oppositely disposed rockers 11. On the other side of the assembly there is a similar spider Sb (shown in dot-dash lines in Figures 3 and 4) similarly arranged with respect to the other pair of rockers 11. When the coupling is assembled in a torque transmission system, one spider will receive torque from a driving shaft Da and the other spider will impart torque to a driven shaft Db.

Figure 5:
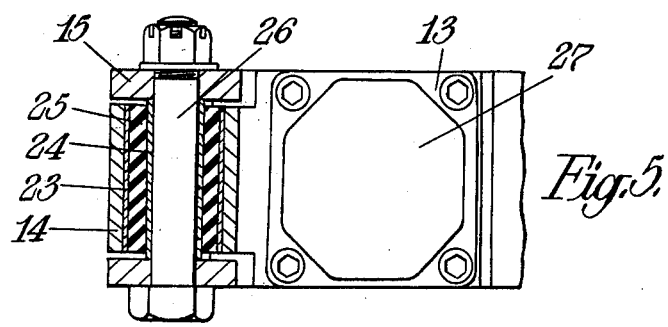
Figure 5 is a section on the line 5—5 of Figure 3.

The hinged connection between the ear 14 of one rocker 11 and the ear 15 of the next rocker, and the hinged connection between the centre portion 12 of one rocker and the arm of the torque-transmitting spider (not shown), are all of them torsionally-resistant resilient connections, that is to say provide a resilient resistance to displacement of the parts rotatively about the hinge axis from a normal position. For this purpose of providing torsionally-resistant resilient hinged connections between the parts, use is made of rubber bushes. Thus, referring again more particularly to Figures 1 and 2, it will be seen that the centre portion 12 of each rocker is formed with a large aperture 16, the ear 14, is formed with a smaller aperture 17, and the ear 15 is formed with a still smaller aperture 18. Into the large central aperture 16 is force-fitted a rubber bush consisting of an outer sleeve 19, an inner sleeve 20, and an intermediate filling 21 of rubber; and into the inner sleeve 20 is force-fitted the driving pins 22 of the corresponding spider. Similarly (see Figure 5), into the larger aperture 17 of the two ear apertures is force-fitted a rubber bush consisting of an outer sleeve 23, and inner sleeve 24, and an intermediate filling 25 of rubber; and into the inner sleeve 24 is force-fitted a bolt 26 passing through the smaller aperture 18 in the ear 15.

With such a coupling, when an angular displacement occurs between the driving and driven spiders, the four rockers 11 swing so that, of the cruciform opening defined by edges 13, the two radial arms on one diameter narrow and elongate while those on the diameter at right angles thereto are broadened and shortened. This displacement is resisted by all eight of the rubber bushes, which are then subjected to torsion and compression.

On the radial edge surfaces 13 of the four rockers, i. e. within the arms of the cruciform opening, are mounted buffers 27 of rubber. When the angular displacement between the driving and driven spiders becomes sufficiently great, so that the two radial arms of the cruciform opening on one diameter are sufficiently narrowed, the particular diameter being determined by the sense of the displacement, which is the sense of excess torque or reverse torque, then the buffers 27 within those narrowed arms make direct engagement with the flats 13 on the adjacent rockers, thereby taking the load directly between the driving spider and the driven spider, and by-passing the rubber hinges between adjacent rockers.

While all eight bushes have equal torsional deflection, the resistance afforded by them can be divided between those connecting the four rockers to the spider arms and those connecting the rockers together in any desired ratio. However, it may be that it is better for the greater part of the torsional resistance to be provided by the spider bushes. Among the reasons why this may be so are these: that to the extent that it is desired that the device shall be capable of acting as a universal joint, to that extent must the spider-connecting bushes be of large diameter and thickness; that if an overhung pin is used, it is better made of large diameter or with a large diameter spigot; that the greatest loads are carried straight from the driving spider to the driven spider through the buffers and once the maximum angular movement has been absorbed no further loading is applied to the hinges of the disc; that such a construction tends to give minimum overall diameter for a given pitch radius; and that if the hinge pins take only a small proportion of the torque they can conveniently be made of the inner sleeve type, and assembled afterwards in the bonded unit.

It seems probable that the effects of placing the rocker hinges on a smaller pitch circle, and of using more than two rockers in each set, will be found to be substantially the same. In both cases one of the consequences will be to increase the proportionate extent to which the bushes are put into compression upon an angular displacement between the spiders. Again, the tension connection between the driving and driven spiders tends to straighten out to a marked degree with a consequent reduction in leverage on the torsion bushes. These two effects together should give a very marked non-linear characteristic that is a low stiffness for a small displacement and a rapid increase in stiffness subsequently.

Figure 6:
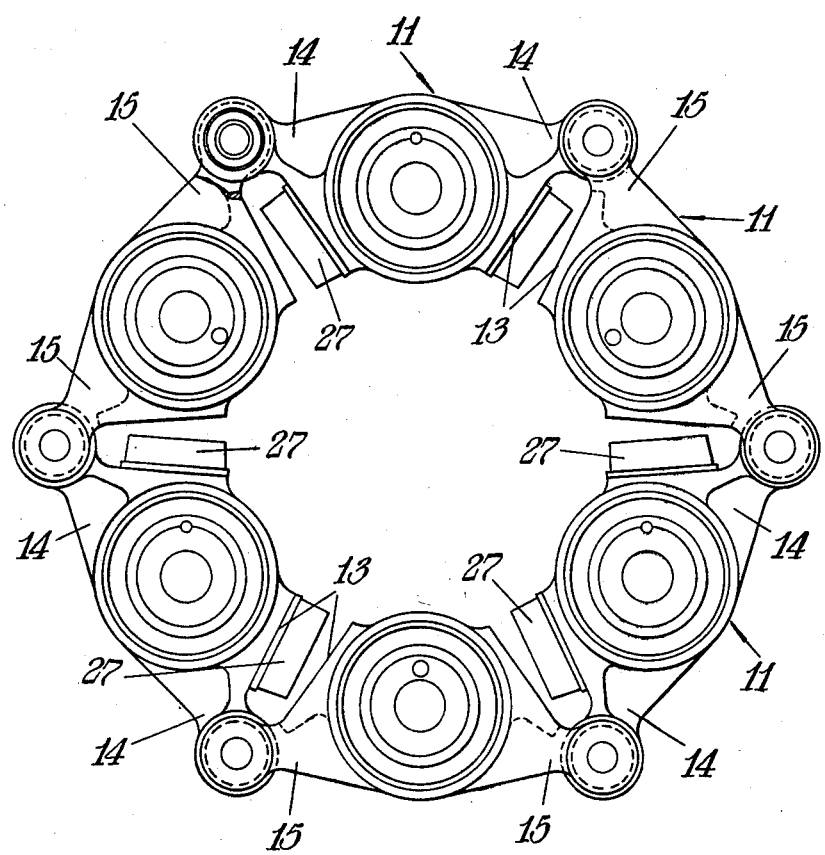
Figure 6 is an end view of a six-rocker assembly.

The embodiment of the invention shown in Figures 6 and 7 is particularly well adapted for the transmission system of a diesel locomotive. From the description already given, and the utilization of the same reference numerals for similar parts, the details of this second embodiment are evident without further enlargement. It will be seen that the principal differences between this and the first embodiment are that in this embodiment there are six rockers 11 instead of four; that instead of these rockers being all alike and each having one solid ear and one forked ear, each rocker is symmetrical in itself, having either two solid ears or two forked ears, and having two buffers 27; and that the axes of the three hinges of any one rocker are not in a straight line.

In Figure 7 is shown an assembly of the coupling in the transmission, (the equivalent, that is, of the spiders referred to in the first embodiment). A flywheel 28 carries inwardly directed attachment arms 29 to which are secured the bolts 30 of the three driving rockers; while a central stub 31 carries a driven flange 32 to which are secured the bolts 33 of the three driven rockers.

It will be noticed that in both the illustrated embodiments the arms of adjacent rockers are at right angles, or expressing it more precisely, the straight line joining the centres of the centre aperture 16 and ear aperture 17, is at right angles to the straight line joining the centres of the next centre aperture 16 and ear aperture 18. The effect of this rectangularity is to give the coupling a substantially linear torque-deflection-curve up to the angle at which it strikes the buffers. If the angle is greater than a right angle, or indeed less than a right angle, torsional deflection can be accommodated only by radial movement of the hinges, that is compression of the rubber. The use of an angle less than a right angle has possibilities, therefore, in making couplings of non-linear characteristic, if the angle between the rocker arms is less than a right angle the driving and driven bushes, which are normally the radially flexible ones, are drawn inwards towards the centre line of the shaft as the coupling twists.

The invention may of course take other forms than those described. Thus it may be useful to damp some or all of the hinges, as by the provision, in the case of the rocker-to-rocker hinges, of friction material between the overlapping ears. Again, the rubber bushes may be provided at the hinges between the rockers only or at the hinges between rocker and spider arm only. The former of these offers an advantage in that the pins of the driving and driven spiders can slide in the rockers so that the drive can be broken without removal of bolts.

The design may be such that the neutral position, that is to say the position from which the possible angular movements are equal in both senses of movement, is any that may be desired. Thus in one case the neutral position was that assumed when the coupling was completely unloaded; this being chosen because the condition where there was most transmission ratio was that of zero torque. In other cases it may be desired, for example, to identify the neutral position with the position of mean load, so that, when the coupling is in the free or no-load position, then those of the buffers 27 that are operative during reverse torque displacement are actually in control, or at least nearer to control than those of the buffers 27 that are operative in excess torque.

It will be appreciated that with a four-rocker coupling any angularity between the driving and driven shafts or other rotative elements is taken up or primarily taken up by conical deflection of the bushes; whereas with a coupling comprising six or more rockers, this take-up is effected primarily by axial deflection of the bushes.

It has been found that the torsional flexibility of the coupling can be increased if the torsion bushes between the rockers and their respective driving or driven members are of the double concentric type having an expanded inner sleeve and a contracted outer sleeve. In this way too a radial stiffness twice as great can be achieved for the same torsional stiffness, or the same radial load capacity maintained for a much reduced torsional stiffness.

I claim:

1. A torque transmission coupling comprising a first set of tangentially arranged rockers, a second set of rockers arranged in circumferential alternation with the rockers of the first set, torsionally-resistant resilient elements pivotally connecting each rocker and the rocker on either side whereby said pivotal connecting points are capable of movement radially of the axis of the coupling, interior edge surfaces on adjacent rockers arranged to form radial openings and rubber buffers in the radial openings so that upon a sufficiently great angular displacement between the driving and driven elements the load is transmitted through said buffers.

2. A torque transmission coupling comprising a first set of tangentially arranged rockers, a second set of rockers arranged in circumferential alternation with, and hinged to, the rockers of the first set, a first spider having the rockers of one set mounted thereon, a second spider having the rockers of the other set mounted thereon, a torsionally-resistant resilient element connecting each rocker with its spider arm, interior edge surfaces on adjacent rockers arranged to form radial openings and rubber buffers in the radial openings so that upon a sufficiently great angular displacement between the driving and driven elements the load is transmitted through said buffers.

3. A torque transmission coupling comprising two sets of intercalated, tangentially arranged rockers forming a circumferential assembly, a torque transmission member connected with each set of rockers, rubber bushes forming hinges between adjacent members of the two sets of rockers, rubber bushes forming hinges which connect the members of the respective sets and their torque transmission member, interior edge surfaces on adjacent rockers arranged to form radial openings and rubber buffers in the radial openings so that upon a sufficiently great angular displacement between the driving and driven elements the load is transmitted through said buffers.

References Cited in the file of this patent

UNITED STATES PATENTS

| | | |
|---|---|---|
| 557,162 | Sperry | Mar. 31, 1896 |
| 1,983,548 | Knox et al. | Dec. 11, 1934 |
| 2,377,467 | Venditty | June 5, 1945 |
| 2,380,672 | Opitz | July 31, 1945 |

FOREIGN PATENTS

| | | |
|---|---|---|
| 905,845 | France | Apr. 30, 1945 |
| 651,890 | Great Britain | Apr. 11, 1951 |